United States Patent
Stenson et al.

(10) Patent No.: US 12,474,478 B2
(45) Date of Patent: Nov. 18, 2025

(54) TECHNIQUES FOR NON-UNIFORM LIDAR BEAM DETECTION DISTANCE ADJUSTMENT IN AN AUTONOMOUS VEHICLE SIMULATION ENVIRONMENT

(71) Applicant: GM Cruise Holdings LLC, San Francisco, CA (US)

(72) Inventors: Richard Stenson, Miami, FL (US); Nivedita Chandrasekaran, San Francisco, CA (US); Amin Aghaei, Fremont, CA (US)

(73) Assignee: GM CRUISE HOLDINGS LLC, San Francisco, CA (US)

( * ) Notice: Subject to any disclaimer, the term of this patent is extended or adjusted under 35 U.S.C. 154(b) by 977 days.

(21) Appl. No.: 17/525,518

(22) Filed: Nov. 12, 2021

(65) Prior Publication Data
US 2023/0152464 A1    May 18, 2023

(51) Int. Cl.
*G01S 17/931*    (2020.01)
(52) U.S. Cl.
CPC ................... *G01S 17/931* (2020.01)
(58) Field of Classification Search
CPC ....... G01S 7/4808; G01S 17/931; G01S 17/42
See application file for complete search history.

(56) References Cited

U.S. PATENT DOCUMENTS

| | | | | |
|---|---|---|---|---|
| 10,782,693 B2 * | 9/2020 | Zhang | ..................... | G08G 1/166 |
| 11,210,537 B2 * | 12/2021 | Koivisto | ................ | G06N 3/044 |
| 11,790,604 B2 * | 10/2023 | Stenson | .................. | G06T 19/20 |
| | | | | 345/419 |
| 12,122,428 B2 * | 10/2024 | Alghanem | ........ | B60W 30/0956 |

* cited by examiner

*Primary Examiner* — An H Do
(74) *Attorney, Agent, or Firm* — CANTOR COLBURN LLP

(57) ABSTRACT

Techniques for simulating LIDAR data are described. In one embodiment, a method for simulating LIDAR data may include retrieving a simulated scene that simulates a real-world scene, the simulated scene including at least one target object having a reflectivity r and located at a range R from a LIDAR sensor, the LIDAR sensor having at least one intrinsic parameter; generating a probability of detection (Pd) drop-off function for the LIDAR sensor, wherein the Pd drop-off function is related to r, R, and the at least one intrinsic parameter; for each data point including a ray emitted by the LIDAR sensor that hits the target object, generating a Pd value using the Pd drop-off function; and determining based on the Pd value whether to drop the data point.

19 Claims, 6 Drawing Sheets

TECHNIQUES FOR NON-UNIFORM LIDAR BEAM DETECTION DISTANCE ADJUSTMENT IN AN AUTONOMOUS VEHICLE SIMULATION ENVIRONMENT

TECHNICAL FIELD OF THE DISCLOSURE

The present disclosure relates generally to autonomous vehicles (AV) simulation environments and, more specifically, to systems and methods for non-uniformly adjusting detection distances of Light Detection and Ranging (LIDAR) beams in such AV simulation environments to more accurately simulate LIDAR operation.

BACKGROUND

An AV may be a vehicle that may be capable of sensing and navigating its environment with little or no user input. An autonomous vehicle may sense its environment using sensing devices, such as Radio Detection and Ranging (RADAR), Light Detection and Ranging (LIDAR), image sensors, cameras, and the like. An autonomous vehicle system may also use information from a global positioning system (GPS), navigation systems, vehicle-to-vehicle communication, vehicle-to-infrastructure technology, and/or drive-by-wire systems to navigate the vehicle. As used herein, the phrase "autonomous vehicle" may include both fully autonomous and semi-autonomous vehicles.

BRIEF DESCRIPTION OF THE DRAWINGS

To provide a more complete understanding of the present disclosure and features and advantages thereof, reference may be made to the following description, taken in conjunction with the accompanying figures, wherein like reference numerals represent like parts, in which.

Figure (FIG. 1 shows an AV environment, according to some embodiments of the present disclosure.

DESCRIPTION OF EXAMPLE EMBODIMENTS OF THE DISCLOSURE

Overview

Figure 1:
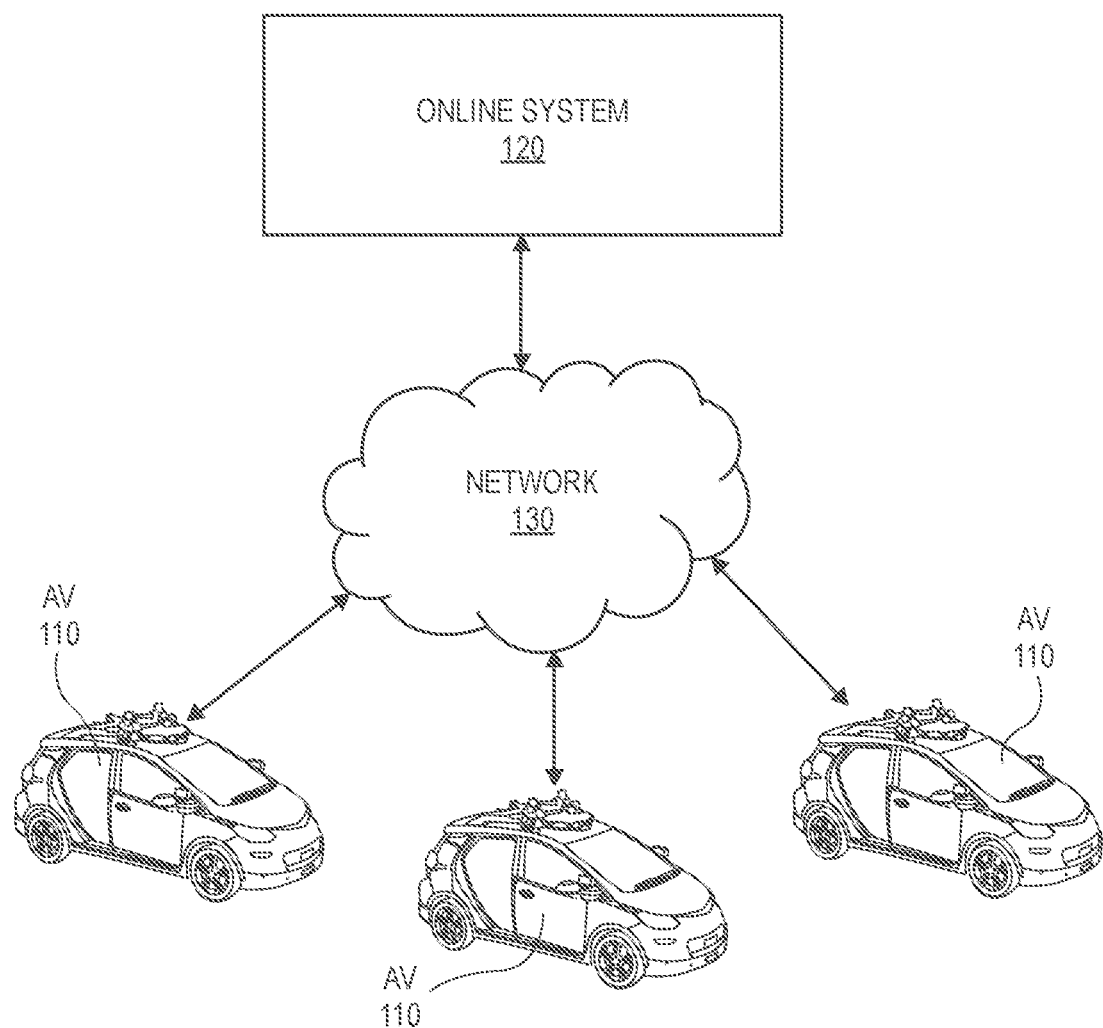

In simulation, a beam from a light detection and ranging (LIDAR) sensor is assumed to detect objects up to a predefined distance. For example, a particular LIDAR beam could be designed and/or marketed to operate up to 200 meters. In theory, if a beam from the LIDAR sensor encounters an object within 200 meters, the LIDAR sensor will report detection of this object so long as the bounced back (or returned) beam has a strength, or signal-to-noise ratio (SNR), above a specified threshold signifying detection of an object. In general, a long-range beam that guarantees a maximum range of 150 meters on a 10% reflective target uses a higher transmit power than a short-range beam that only guarantees a maximum range of 100 meters on a 10% reflective target.

In practice, however, LIDAR sensors do not strictly operate according to their stated capabilities and do not uniformly operate, such that under normal or potentially even under optimal operating conditions (e.g., clean air), a LIDAR sensor that is marketed to detect objects up to 200 meters may only detect objects up to 150 meters. Additionally, the distance of detection of a beam from a LIDAR sensor may be dependent on environmental conditions, air quality, or other varying factors. For example, a first beam from a LIDAR sensor transmitted in optimal conditions (e.g., through clean air) may detect an object up to 150 meters, while a second beam from the same LIDAR sensor transmitted through dust, fog, or other particulate matter may detect an object only up to 100 meters. Such non-uniformity in detection distances may also be based on an inconsistent beam transmission strengths by the LIDAR sensor. In practice, the failure to properly simulate the non-uniformity and reduced overall transmission distance of LIDAR beams may result in too many points on an object being detected in simulation, as compared to real-world, scenarios.

In accordance with embodiments described herein, to simulate this non-uniformity and reduced detection distance (as compared to marketed detection distance) of a LIDAR sensor, a LIDAR simulation technique implements a probability of detection (Pd) drop-off function that may intelligently limit the detection distance of each LIDAR beam in simulation. In particular, the Pd drop-off function may assume that LIDAR beams will travel some predefined distance corresponding to the capabilities of the LIDAR sensor (e.g., 150 meters for a LIDAR sensor having a marketed detection distance of 200 meters). In some embodiments, the Pd drop-off function may implement a random modifier that stops certain beams short of the predefined detection distance, thus eliminating a corresponding reflection indicative of detection of an object, to simulate a gradient falloff of the beams over distance. For example, a Pd drop-off function may implement a random falloff of beams past the predefined distance for the LIDAR sensor (e.g., 5% falloff of beams per meter for each meter past the predefined distance of 100 meters).

In operation of some embodiments, a LIDAR beam in simulation may be allowed to encounter, or hit, an object in space and the distance of that object as indicated by the reflected signal detected by the LIDAR sensor is compared against the value from the Pd drop-off function. If the value from the Pd drop-off function is less than the distance of the detected object, the detection of the object may be dropped (i.e., the point in space may be dropped). In general, the Pd drop-off function may account for various factors that impact LIDAR sensor performance, including but not limited to the distance between the sensor and the object, the medium through which the beams travel (e.g., how clear the air is, including atmospheric effects), the temperature of the medium through which the beams travel, etc., in simulating LIDAR performance.

In various embodiments, a LIDAR simulation technique that implements a Pd drop-off function may enable intelligent limitation of a duration and/or distance of a LIDAR beam to below the marketed duration/distance of the corresponding sensor. Additionally, the Pd drop-off function may enable random limitation of the distance of each individual LIDAR beam from a single sensor to simulate the non-uniformity of the medium through which the beams may travel, as well as the non-uniformity of the transmission power of the LIDAR sensor. Still further, the LIDAR simulation technique including a Pd drop-off function as described herein may enable a comparison of the distance of a detected object to an output of the Pd drop-off function to determine whether the point will be dropped or kept. In general, the techniques described herein may allow for a more accurate simulation of LIDAR sensor functionality.

As will be appreciated by one skilled in the art, aspects of the present disclosure may be embodied in various manners (e.g., as a method, a system, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units (e.g., one or more microprocessors) of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g., to the existing perception system devices or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims or select examples. In the following description, reference may be made to the drawings where like reference numerals can indicate identical or functionally similar elements. It will be understood that elements illustrated in the drawings are not necessarily drawn to scale. Moreover, it will be understood that certain embodiments can include more elements than illustrated in a drawing or a subset of the elements illustrated in a drawing. Further, some embodiments can incorporate any suitable combination of features from two or more drawings.

Other features and advantages of the disclosure will be apparent from the following description and the claims.

As described herein, one aspect of the present technology may be the gathering and use of data available from various sources to improve quality and experience. The present disclosure contemplates that in some instances, this gathered data may include personal information. The present disclosure contemplates that the entities involved with such personal information respect and value privacy policies and practices.

The following disclosure describes various illustrative embodiments and examples for implementing the features and functionality of the present disclosure. While particular components, arrangements, or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, or conditions, the phrase "between X and Y" represents a range that may include X and Y.

In addition, the terms "comprise," "comprising," "include," "including," "have," "having" or any other variation thereof, are intended to cover a non-exclusive inclusion. For example, a method, process, device, or system that comprises a list of elements may be not necessarily limited to only those elements but may include other elements not expressly listed or inherent to such method, process, device, or system. Also, the term "or" refers to an inclusive or and not to an exclusive or.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

The systems, methods and devices of this disclosure each have several innovative aspects, no single one of which may be solely responsible for all of the desirable attributes disclosed herein. Details of one or more implementations of the subject matter described in this Specification are set forth in the description below and the accompanying drawings.

Example AV Environment

FIG. 1 shows an AV environment 100 according to some embodiments of the present disclosure. The AV environment 100 may include AVs 110 and an online system 120 in communication with the AVs 110 through a network 130. In other embodiments, the AV environment 100 may include fewer, more, or different components. For instance, the AV environment 100 may include a different number of AVs. A single AV may be referred to herein as AV 110, and multiple AVs are referred to collectively as AVs 110.

An AV 110 may be a vehicle that may be capable of sensing and navigating its environment with little or no user input. The AV 110 may be a semi-autonomous or fully autonomous vehicle, e.g., a boat, an unmanned aerial vehicle, a driverless car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle. The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions; e.g., windshield wipers, headlights, turn indicators, air conditioning, etc.

An AV 110 may include an onboard sensor suite that detects objects in the surrounding environment of the AV 110 and generates sensor data describing the objects. Examples of the objects include people, buildings, trees, traffic signs, other vehicles, landmarks, street markers, and so on. The onboard sensor suite may generate sensor data of the objects. The sensor data of the objects may include images, depth information, location information, or other types of sensor data. The onboard sensor suite may include various types of sensors. In some embodiments, the onboard sensor suite may include a computer vision ("CV") system, localization sensors, and driving sensors. For example, the onboard sensor suite may include photodetectors, cameras, RADAR, Sound Navigation and Ranging (SONAR), LIDAR, GPS, wheel speed sensors, inertial measurement units (IMUS), accelerometers, microphones, strain gauges, pressure monitors, barometers, thermometers, altimeters, ambient light sensors, etc. The sensors may be located in various positions in and around the AV 110.

The AV 110 may also include an onboard controller. The onboard controller controls operations and functionality of the AV 110. In some embodiments, the onboard controller may be a general-purpose computer, but may additionally or alternatively be any suitable computing device. The onboard controller may be adapted for I/O communication with other components of the AV 110 (e.g., the onboard sensor suite, etc.) and external systems (e.g., the online system 120). The onboard controller may be connected to the Internet via a wireless connection (e.g., via a cellular data connection). Additionally or alternatively, the onboard controller may be coupled to any number of wireless or wired communication systems.

The onboard controller may process sensor data generated by the onboard sensor suite and/or other data (e.g., data received from the online system 120) to determine the state of the AV 110. In some embodiments, the onboard controller implements an autonomous driving system (ADS) for controlling the AV 110 and processing sensor data from the onboard sensor suite and/or other sensors in order to determine the state of the AV 110. For instance, the onboard controller may input the sensor data into a classification model to identify and classify objects detected by the onboard sensor suite. The onboard controller may receive the classification model from a different system, e.g., the online system 120. Based upon the output of the classification model, vehicle state, or programmed instructions, the onboard controller can modify or control the behavior of the AV 110. For instance, the onboard controller can use the output of the classification model to localize or navigate the AV 110. More information of the onboard controller is described below in conjunction with FIG. 2.

An AV 110 may also include a rechargeable battery that powers the AV 110. The battery may be a lithium-ion battery, a lithium polymer battery, a lead-acid battery, a nickel-metal hydride battery, a sodium nickel chloride ("zebra") battery, a lithium-titanate battery, or another type of rechargeable battery. In some embodiments, the AV 110 may be a hybrid electric vehicle that may also include an internal combustion engine for powering the AV 110, e.g., when the battery has low charge. In some embodiments, the AV 110 may include multiple batteries, e.g., a first battery used to power vehicle propulsion, and a second battery used to power AV hardware (e.g., the onboard sensor suite and the onboard controller). The AV 110 may further include components for charging the battery, e.g., a charge port configured to make an electrical connection between the battery and a charging station.

The online system 120 can support the operation of the AVs 110. In some embodiments, the online system 120 may manage a service that provides or uses the AVs 110, e.g., a service for providing rides to users with the AVs 110, or a service that delivers items using the AVs (e.g., prepared foods, groceries, packages, etc.). The online system 120 may select an AV from a fleet of AVs 110 to perform a particular service or other task. The online system 120 may instruct the selected AV 110 to autonomously drive to a particular location (e.g., a delivery address). The online system 120 may also manage fleet maintenance tasks, such as charging and servicing of the AVs 110.

In some embodiments, the online system 120 may also provide the AV 110 (and particularly, onboard controller) with system backend functions. The online system 120 may include one or more switches, servers, databases, live advisors, or an automated voice response system (VRS). The online system 120 may include any or all of the aforementioned components, which may be coupled to one another via a wired or wireless local area network (LAN). The online system 120 may receive and transmit data via one or more appropriate devices and network from and to the AV 110, such as by wireless systems, such as a wireless local area network (WLAN) (e.g., an IEEE 802.11 based system), a cellular system (e.g., a wireless system that utilizes one or more features offered by the 3rd Generation Partnership Project (3GPP), including GPRS), and the like. A database at the online system 120 can store account information such as subscriber authentication information, vehicle identifiers, profile records, behavioral patterns, and other pertinent subscriber information. The online system 120 may also include a database of roads, routes, locations, etc. permitted for use by the AV 110. The online system 120 may communicate with the AV 110 to provide route guidance in response to a request received from the vehicle.

For example, based upon information stored in a mapping system of the online system 120, the online system 120 may determine the conditions of various roads or portions thereof. The AV 110, may, in the course of determining a navigation route, receive instructions from the online system 120 regarding which roads or portions thereof, if any, are appropriate for use under certain circumstances, as described herein. Such instructions may be based in part on information received from the AV 110 or other autonomous vehicles regarding road conditions. Accordingly, the online system 120 may receive information regarding the roads/routes generally in real-time from one or more vehicles. More details of the online system 120 are provided below in conjunction with FIGS. 3A and 3B.

The network 130 can support communications between an AV 110 and the online system 120. The network 130 may comprise any combination of local area and/or wide area networks, using both wired and/or wireless communication systems. In one embodiment, the network 130 may use standard communications technologies and/or protocols. For example, the network 130 may include communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 130 may include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 130 may be represented using any suitable format, such as hypertext markup language (HTML) or extensible markup language (XML). In some embodiments, all or some of the communication links of the network 130 may be encrypted using any suitable technique or techniques.

Example Onboard Controller

Figure 2:
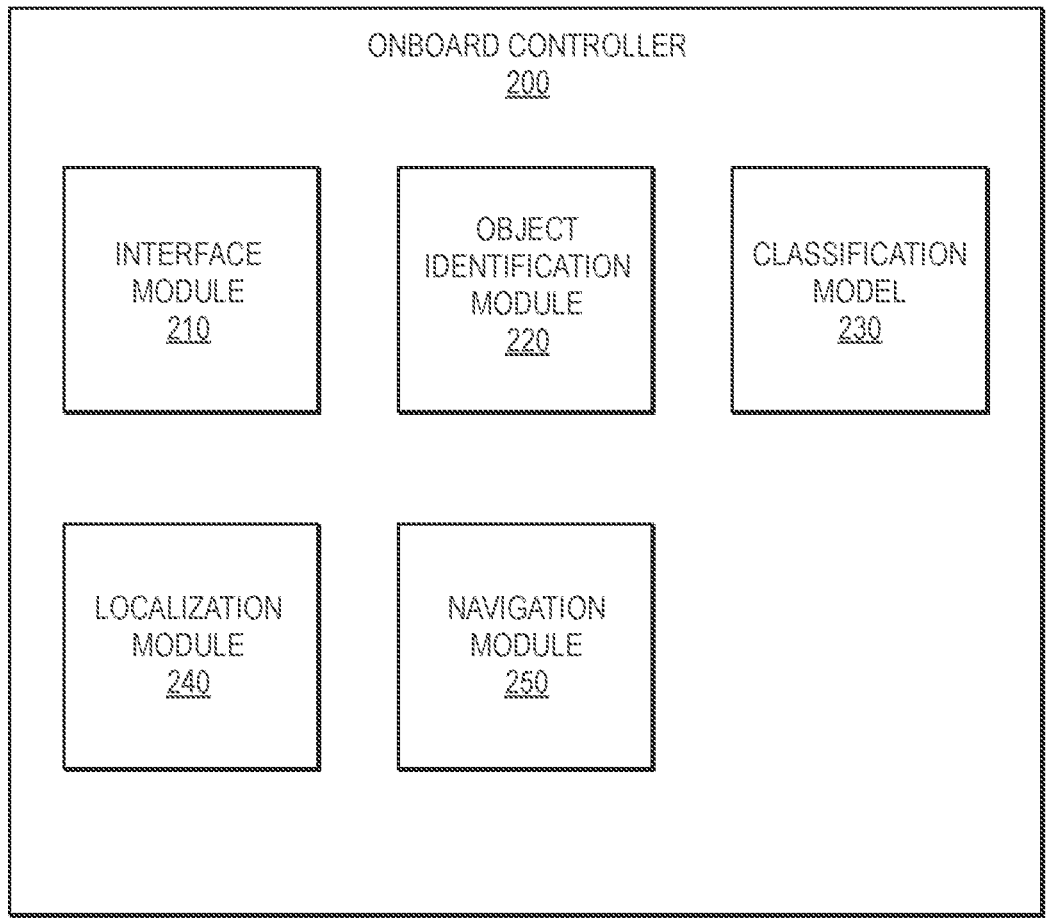
FIG. 2 is a block diagram illustrating an onboard controller of an AV, according to some embodiments of the present disclosure.

FIG. 2 is a block diagram illustrating an onboard controller 200 of an AV 110 according to some embodiments of the present disclosure. The onboard controller 200 may include an interface module 210, an object identification module 220, a classification model 230, a localization module 240, and a navigation module 250. Alternative configurations, different or additional components may be included in the onboard controller 200. Further, functionality attributed to one component of the onboard controller 200 may be accomplished by a different component included in the onboard controller 200, the AV 110, or a different system, e.g., the online system 120.

The interface module 210 can facilitate communications of the onboard controller 200 with other systems. For instance, the interface module 210 may support communications of the onboard controller 200 with the online system 120. The interface module 210 may also facilitate communications of the onboard controller 200 with other components of the AV 110, e.g., the onboard sensor suite. For instance, the interface module 210 may retrieve sensor data generated by the onboard sensor suite, and so on.

The object identification module 220 can use the classification model 230 to determine categories of objects. The classification model 230 may be a real-world model trained by using data collected from a real-world scene and/or a simulated model trained by using data collected from a simulated scene. The object identification module 220 may input sensor data of the objects into the classification model 230. The classification model 230, receiving the sensor data, can output the categories of the objects. The sensor data of the objects may include sensor data generated by the onboard sensor suite of the AV 110, such as images, depth information, location information, etc. The sensor data of the objects may include data received from the online system 120 or a sensor external to the AV 110.

The localization module 240 can localize the AV 110. In some embodiments, the localization module 240 determines where the AV is located, e.g., whether the AV 110 has arrived at a predetermined location (e.g., a destination of a delivery service). For instance, the localization module 240 may determine the location of the AV 110. The localization module 240 may further compare the location of the AV 110 with the predetermined location to determine whether the AV 110 has arrived. The localization module 240 can further localize the AV 110 with respect to a site or an object. For instance, the localization module 240 can determine a pose (e.g., position and/or orientation) of the AV 110 in the site. The localization module 240 can also determine a pose of the AV 110 with respect to an object in the site.

The localization module 240 may use sensor data generated by the onboard sensor suite to determine where the AV 110 is located. The sensor data may include information describing an absolute or relative position of the AV 110 (e.g., data generated by global positioning system (GPS), global navigation satellite system (GNSS), inertial measurement unit (IMU), etc.), information describing features surrounding the AV 110 (e.g., data generated by a camera, RADRA, SONAR, LIDAR, etc.), information describing motion of the AV 110 (e.g., data generated by the motion sensor), or some combination thereof. Additionally or alternatively, the localization module 240 may use objects identified by the object identification module 220 to localize the AV 110. For instance, the localization module 240 uses the identification of an object to determine whether the AV 110 has arrived at a location associated with the object.

The navigation module 250 can control the motion of the AV 110. The navigation module 250 may control the motor of the AV 110 to start, pause, resume, or stop motion of the AV 110. The navigation module 250 may further control the wheels of the AV 110 to control the direction the AV 110 will move. In various embodiments, the navigation module 250 generates a navigation route for the AV 110 based on a location of the AV 110, a destination, and a map. The navigation module 250 may receive the location of the AV 110 from the localization module 240. The navigation module 250 may receive a request to go to a location and generate a route to navigate the AV 110 from its current location, which may be determined by the localization module 240, to the location. The navigation module 250 may receive the destination through the interface module 210.

In some embodiments, the navigation module 250 can control the motion of the AV 110 based on object identification performed by the object identification module 220. The navigation module 250 may determine whether to stop or start of the motion of the AV 110 based on the identification of one or more objects in the vicinity of the AV 110. In an example where the object identification module 220 identifies a stop sign in the vicinity of the AV 110, the navigation module 250 can stop the motion of the AV 110. The navigation module 250 may determine or modify a navigation route for the AV 110 based on the identification of one or more objects in the vicinity of the AV 110. For instance, after the object identification module 220 identifies a tree in the vicinity of the AV 110, the navigation module 250 may control the AV 110 to navigate around the tree. The navigation module 250 may also determine or modify a motion speed of the AV 110 based on the identification of objects in the vicinity of the AV 110. The navigation module 250 may further change a pose of the AV 110 based on the identification of objects in the vicinity of the AV 110.

Example Online System

Figure 3A:
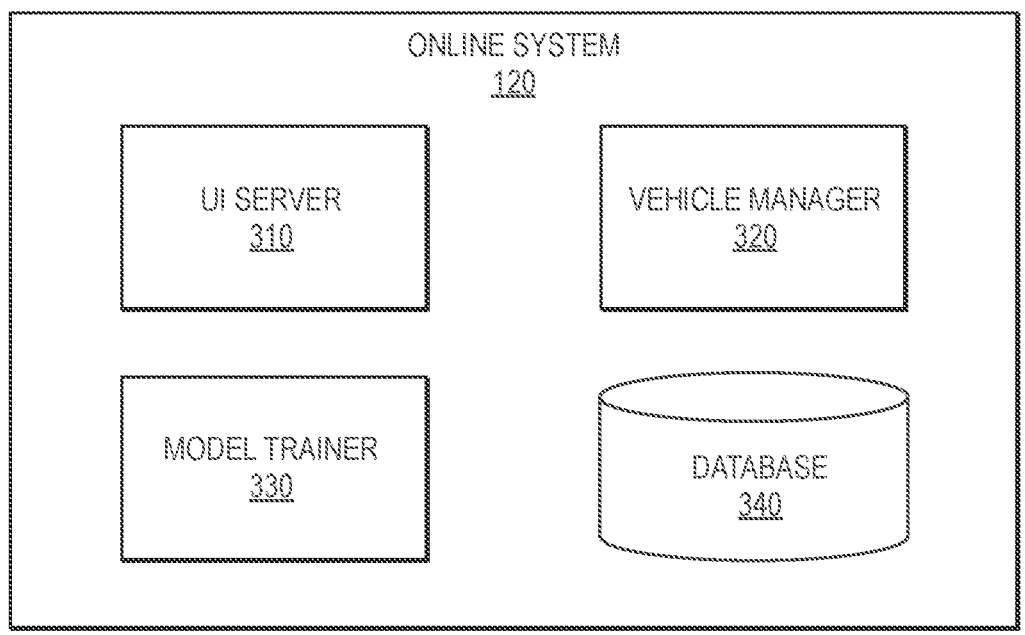
FIGS. 3A and 3B are block diagrams illustrating an online system, according to some embodiments of the present disclosure.

FIG. 3A is a block diagram illustrating the online system 120 according to some embodiments of the present disclosure. The online system 120 may include a user interface (UI) server 310, a vehicle manager 320, a model trainer, and a database 340. In alternative configurations, different or additional components may be included in the online system 120. Further, functionality attributed to one component of the online system 120 may be accomplished by a different component included in the online system 120 or a different system, e.g., the onboard controller 200.

The UI server 310 may be configured to communicate with third-party devices that provide a UI to users. For example, the UI server 310 may be a web server that provides a browser-based application to third-party devices, or the UI server 310 may be a mobile app server that interfaces with a mobile app installed on third-party devices. The UI enables the user to access a service of the online system 120, e.g., to request a delivery by using an AV 110.

The vehicle manager 320 manages and communicates with a fleet of AVs, e.g., the AVs 110 in FIG. 1. The vehicle manager 320 may assign AVs 110 to various tasks and direct the movements of the AVs 110 in the fleet. For example, the vehicle manager 320 assigns an AV 110 to perform a delivery service requested by a user through the UI server 310. The vehicle manager 320 may instruct AVs 110 to drive to other locations while not servicing a user, e.g., to improve geographic distribution of the fleet, to anticipate demand at particular locations, to drive to a charging station for charging, etc. The vehicle manager 320 also instructs AVs 110 to return to AV facilities for recharging, maintenance, or storage.

The model trainer 330 can train a LIDAR model to be used by AVs 110 to identify objects. The model trainer 330 may utilize a simulated scene that may include simulated objects generated based on real-world objects in a real-world scene. In an embodiment, each simulated object may be a virtual object and represents one of the real-world objects.

The model trainer 330 may also simulate navigation of an AV 110 in the simulated scene, e.g., by generating a virtual AV that simulates the AV 110 and navigating the virtual AV in the simulated scene. The virtual AV may navigate along a route in the vicinity of the virtual objects and provide simulated sensor data generated by the onboard sensor suite of the virtual AV. The model trainer 330 can form a training set by including the data of the virtual objects and the labels of the virtual objects. The model trainer can further train the LIDAR model by using the training set.

The database 340 can store data used, generated, received, or otherwise associated with the online system 120. The database 340 may store LIDAR models generated by the model trainer 330. The database 340 may also store data associated with the AVs 110, data received from third-party systems, and so on.

Figure 3B:
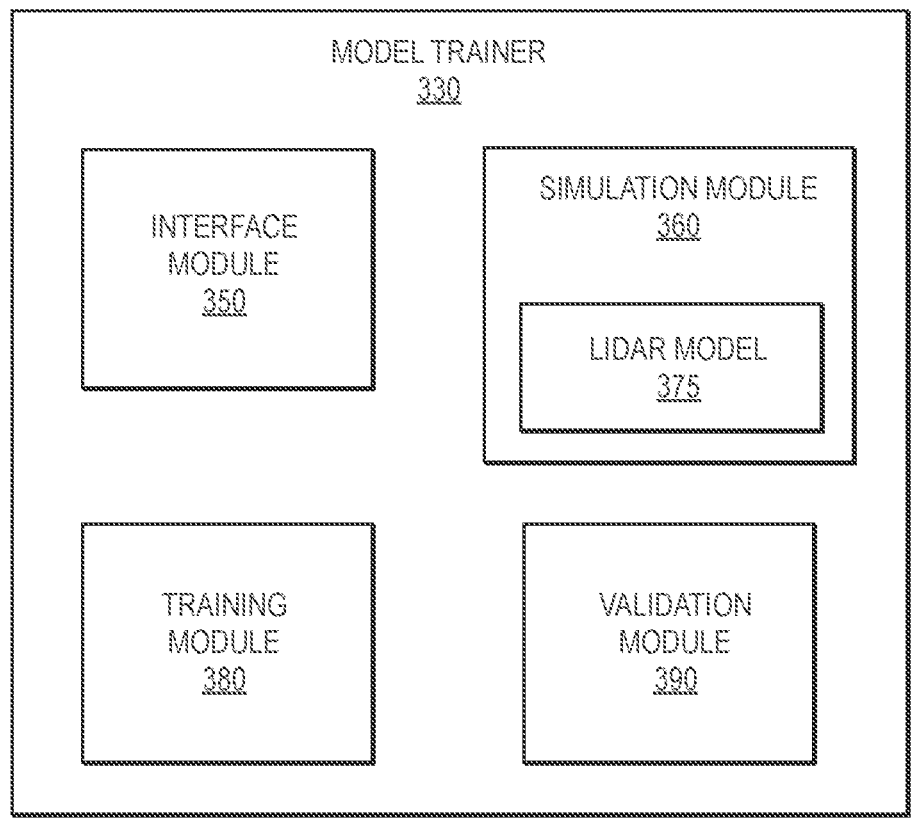

FIG. 3B is a block diagram illustrating the model trainer 330 of the online system 120 according to some embodiments of the present disclosure. The model trainer 330 in FIG. 3B may include an interface module 350, a simulation module 360 including a LIDAR model 375 a training module 380, and a validation module 390.

The interface module 350 can facilitate communications of the model trainer 330 with other systems. For instance, the interface module 350 may support communications of the model trainer 330 with the other components of the online system 120. The interface module 210 may also facilitate communications of the model trainer 330 with other components of the AV 110, e.g., the onboard sensor suite. For instance, the interface module 350 may receive a simulated scene from the database 340. As another example, the interface module 350 may receive sensor data generated by the onboard sensor suite, and so on.

The simulation module 360 can generate simulated scenes. The simulation module 360 may generate a simulated scene based on a real-world scene, e.g., a city or a district in a city that was captured by sensors of AVs 110 operating in the real-world. In some embodiments, the simulation module 360 may identify real-world objects in the real-world scene. The real-world objects may include people, buildings, street marks (e.g., curbs, lane markers, etc.), traffic signs, trees, landmarks, or other types of objects that can be present in the real-world scene. The simulation module 360 may generate a simulated object for each identified real-world object (or each of a subset of the identified real-world objects). The simulated object may be a virtual object representing the corresponding real-world object; in other words, the simulated object may be a graphic representation of a real-world object. The simulation module 360 may further combines the simulated objects to generate the simulated scene. Accordingly, the simulated scene can be a virtual representation of the real-world scene.

The simulation module 360 may label the simulated objects. For instance, the simulation module 360 may generate a label for each simulated object based on the known category of the simulated object. The label may describe the category of the simulated object. The simulation module 360 may also generate a simulated AV, which is a virtual AV that simulates an AV 110. The simulation module 360 may place the virtual AV in the simulated scene. The simulated AV can navigate in the simulated scene. The simulated AV may include a simulated onboard sensor suite that simulates the onboard sensor suite of the AV 110. The virtual onboard sensor suite can detect objects in the surrounding environment of the simulated AV. For instance, the simulated onboard sensor suites may generate simulated sensor data of the simulated objects, e.g., images, audio, depth information, location information, and so on.

The reference classification model may be a real-world model or simulated model. The real-world model is a classification model trained by using sensor data of real-world objects, e.g., sensor data generated by an onboard sensor suite of an AV 110 navigating in a real-world scene where the real-world objects are located. The real-world scene used for training the real-world model and the real-world scene used for generating the simulated scene may be the same scene. For example, the real-world model may be trained by data collected from locations throughout San Francisco and the simulated scene is generated to simulate these locations in San Francisco. As another example, the real-world model may be trained by data collected from locations in San Francisco, but the simulated scene is generated to simulate locations in Phoenix. The simulated model is a classification model trained by using simulated sensor data of simulated objects collected from a simulated scene representing a real-world scene. The simulated scene used for training the simulated model and the simulated scene generated by the simulation module 360 may be the same.

The training module 380 can train the LIDAR model 375 by using the simulated scene. The training module 380 applies machine learning techniques to generate the LIDAR model 375 that when applied to sensor data of objects outputs sensor data that is representative of real-world sensor data. As part of the generation of the LIDAR model 375, the training module 380 forms a training set. The training set may include the sensor data of one or more simulated objects and the labels of the simulated objects.

The training module 380 may extract feature values from the training set, the features being variables deemed potentially relevant to classification of the simulated objects. The feature values extracted by the training module 380 may include, e.g., shape, size, color, pattern, material, or other types of attributes of the objects. An ordered list of the features for an object may be herein referred to as the feature vector for the object. In one embodiment, the training module 380 may apply dimensionality reduction (e.g., via linear discriminant analysis (LDA), principal component analysis (PCA), or the like) to reduce the amount of data in the feature vectors to a smaller, more representative set of training data.

The training module 380 may use supervised machine learning to train the classification model, with the feature vectors of the training set serving as the inputs. Different machine learning techniques—such as linear support vector machine (linear SVM), boosting for other algorithms (e.g., AdaBoost), neural networks (e.g., convolutional neural network), logistic regression, naïve Bayes, memory-based learning, random forests, bagged trees, decision trees, boosted trees, or boosted stumps—may be used in different embodiments.

In some embodiments, the training module 380 may train the LIDAR model by modifying a simulated model or real-world model. For instance, the training module 380 may re-train the simulated model or real-world model by using additional data to create the LIDAR model. In some embodiments, the training module 380 may continuously train the LIDAR model using new training data. The validation module 390 can validate a performance of the LIDAR model in simulating real-world LIDAR data. In some embodiments, the accuracy of the LIDAR model may be quantified as a score and compared with a threshold score. In an example in which the validation module 390 determines that the accuracy score of the LIDAR model is lower than the threshold score (or the accuracy score of a reference model), the validation module 390 may instruct the training module 380 to re-train the LIDAR model. In one embodiment, the training module 380 may iteratively re-train the LIDAR model until the occurrence of a stopping condition, such as an indication by the accuracy score that the LIDAR model may be sufficiently accurate, or a number of training rounds having taken place.

Example Simulated Scene

Figure 4:
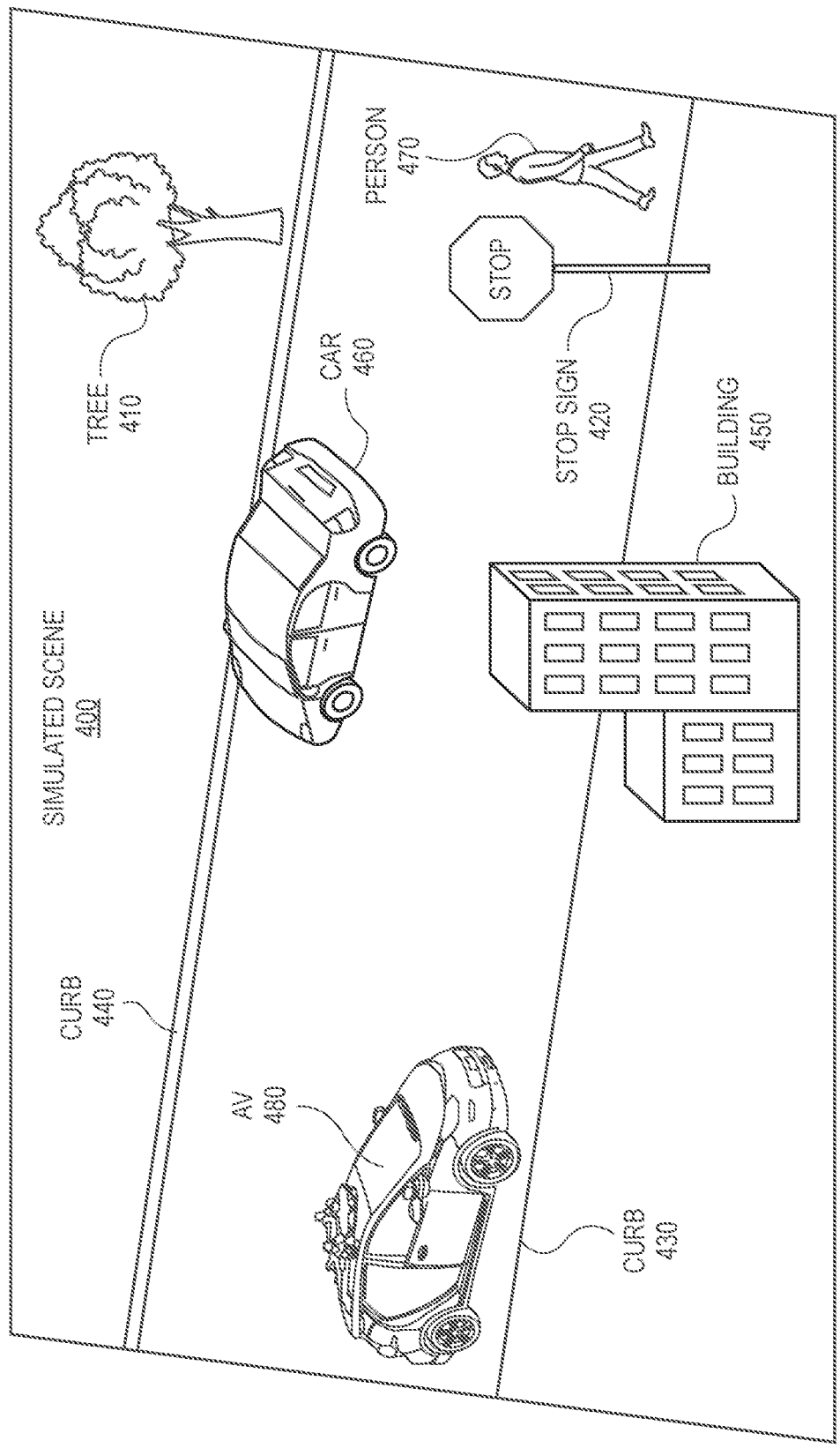
FIG. 4 illustrates a simulated scene, according to some embodiments of the present disclosure.

FIG. 4 illustrates a simulated scene 400 according to some embodiments of the present disclosure. The simulated scene 400 may be generated by the simulation module 360 in FIG. 3B. The simulated scene 400 is a virtual representation of a real-world scene. In FIG. 4, the simulated scene 400 may include a plurality of virtual objects: a virtual tree 410, a virtual stop sign 420, a virtual curb 430, another virtual curb 440, a virtual building 450, a virtual car 460, and a virtual person 470. Additionally, the simulated scene 400 may include a simulated AV 480, which may be a virtual representation of a real-world AV, e.g., the AV 110. The simulated AV 480 may have a simulated onboard sensor suite that detects objects in the surrounding environment of the simulated AV 480. The simulated onboard sensor suite may be a virtual representation of the onboard sensor suite of an AV 110 described above. The simulated AV 480 may also have a simulated onboard controller that is a virtual representation of the onboard controller 200. The simulated AV 480 may also navigate in the simulated scene 400.

In other embodiments, the simulated scene 400 may include different, more, or fewer virtual objects. Each of the virtual objects may be a virtual representation of a real-world object in the real-world scene. In some embodiments, the real-world scene may include real-world objects that are not represented by any of the virtual objects in the simulated scene. The simulated scene 400 can be used to train a simulated model; e.g., a LIDAR model.

Example LIDAR Operation Scenario

Figure 5A:
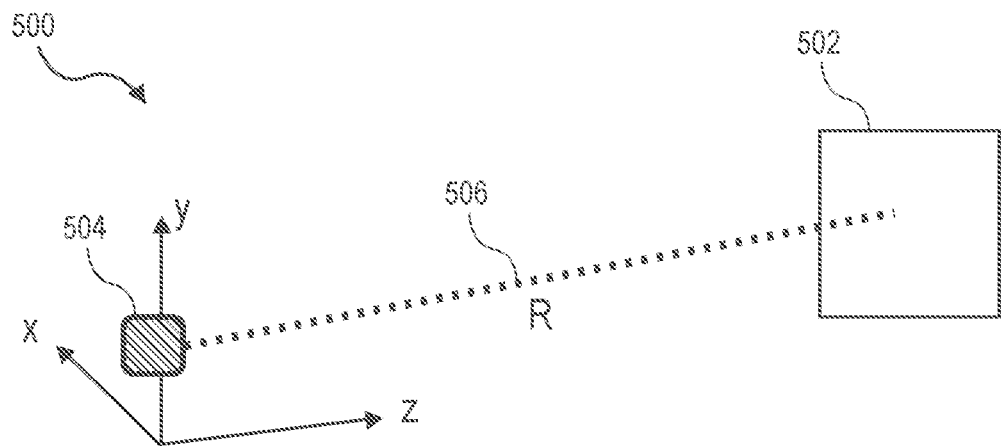
FIGS. 5A and 5B illustrate an example LIDAR operation scenario, according to some embodiments of the present disclosure.
Figure 5B:
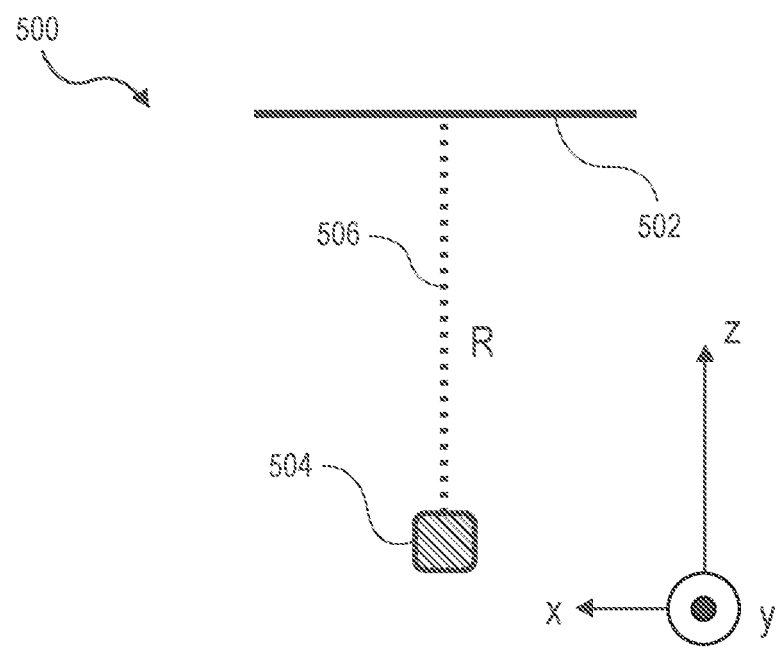

FIGS. 5A and 5B illustrate an example LIDAR operation scenario 500 according to some embodiments of the present disclosure. In particular, FIG. 5A illustrates a perspective view of the scenario 500, whereas FIG. 5B illustrates a top-down plan view of the scenario 500. As shown in FIGS. 5A and 5B, scenario 500 may include a target object (or simply "target") 502, having a reflectivity r and positioned at a varying range R meters (m) relative to a LIDAR 504. For purposes of simplicity, the LIDAR 504 is illustrated as including a single laser transceiver pair that emits a ray 506 and the object 502 exhibits Lambertian reflectance. In certain embodiments the scenario 500 may illustrate a virtual representation of a real-world scenario, in which case target 502 is a virtual object and LIDAR 504 is implemented using a LIDAR model.

In a situation in which scenario 500 represents a particular test scenario, the ray 506 is fired at an azimuth of zero degrees, an elevation of zero degrees, and a frame rate of 10 hertz (Hz) and has a normal angle of incidence on the target 504. The LIDAR 504 is placed at x=0, y=1 m, and z=0.

Example Processes for LIDAR Simulation Using a Pd Drop-Off Function

Figure 6:
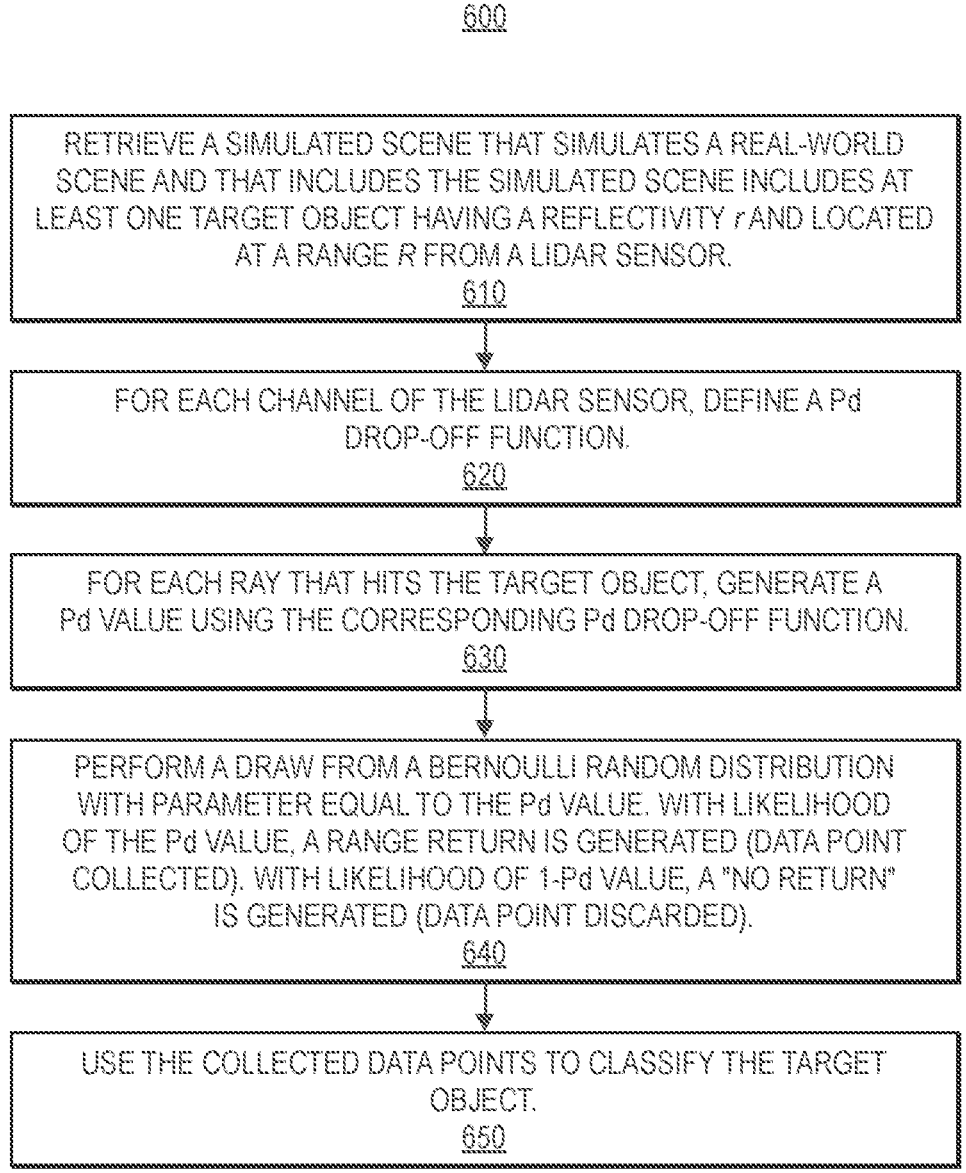
FIG. 6 is a flowchart showing a method of implementing a Pd drop-off function for LIDAR simulation data, according to some embodiments of the present disclosure.

FIG. 6 is a flowchart showing a method 600 of implementing a Pd drop-off function for LIDAR simulation data according to some embodiments of the present disclosure. In some embodiments, the method may be performed by the online system 120, such as the simulation module 360 and LIDAR model 375 of the online system 120.

As previously noted, LIDARs do not strictly operate according to their stated capabilities and do not uniformly operate, such that under normal or potentially even under optimal operating conditions (e.g., clean air), a LIDAR sensor that is marketed to detect objects up to 200 meters may only detect objects up to 150 meters. Additionally, the distance of detection of a beam from a LIDAR sensor may be dependent on environmental conditions, air quality, or other varying factors. For example, a first beam from a LIDAR sensor transmitted in optimal conditions (e.g., through clean air) may detect an object up to 150 meters, while a second beam from the LIDAR sensor transmitted through dust, fog, or other particulate matter may detect an object only up to 100 meters. Such non-uniformity in detection distances may also be based on an inconsistent beam transmission strengths by the LIDAR sensor. In practice, the failure to properly simulate the non-uniformity and reduced overall transmission distance of LIDAR beams may result in too many points on an object being detected in simulated, as compared to real-world, scenarios.

To simulate this non-uniformity and reduced detection distance (as compared to marketed detection distance) of a LIDAR sensor, a LIDAR simulation technique implements probability of detection (Pd) drop-off function that intelligently effectively limits the detection distance of each LIDAR beam in simulation. In particular, the Pd drop-off function assumes that LIDAR beams will travel some predefined distance corresponding to various intrinsic parameters of the beam. The Pd drop-off function implements a random modifier that stops certain beams short of the predefined detection distance, thus eliminating a corresponding reflection indicative of detection of an object, to simulate a gradient falloff of the beams over distance. For example, a Pd drop-off function may implement a random falloff of beams past the predefined distance for the LIDAR sensor (e.g., 5% falloff of beams per meter for each meter past the predefined distance of 100 meters).

In operation of some embodiments, a LIDAR beam in simulation is allowed to encounter, or hit, an object in space and the distance of that object as indicated by the reflected signal detected by the LIDAR sensor is compared against the value from the Pd drop-off function. If the value from the Pd drop-off function is less than the distance of the detected object, the detection of the object is dropped (i.e., the point is space is dropped). In general, the Pd drop-off function may account for various factors that impact LIDAR sensor performance, including but not limited to the distance between the sensor and the object, the medium through which the beams travel (e.g., how clear the air is, including atmospheric effects), the temperature of the medium through which the beams travel, etc., in simulating LIDAR performance.

In various embodiments, a LIDAR simulation technique that implements a Pd drop-off function enables intelligent limitation of a duration and/or distance of a LIDAR beam to below the marketed duration/distance of the corresponding sensor. Additionally, the Pd drop-off function enables random limitation of the distance of each individual LIDAR beam from a single sensor to simulate the non-uniformity of the medium through which beams travel, as well as the non-uniformity of the transmission power of the LIDAR sensor. Still further, the LIDAR simulation technique including a Pd drop-off function as described herein enables a comparison of the distance of a detected object to an output of the Pd drop-off function to determine whether the point will be dropped or kept. In general, the technique allows for a more accurate simulation of LIDAR sensor functionality.

In step 610, the online system 120 retrieves a simulated scene that may simulate a real-world scene. The online system 120 may generate the simulated scene by using data collected from the real-world scene. In accordance with embodiments described herein, the simulated scene may include at least one target object having a reflectivity r and located at a range R from a virtual of simulated (or modeled) LIDAR sensor. In accordance with features of embodiments described herein, the LIDAR sensor being simulated may be a spinning LIDAR sensor in which each channel (comprising an individual transceiver pair) operates at a different transmit power.

In step 620, for each channel of the virtual LIDAR sensor, a Pd drop-off function may be defined. In certain embodiments, the Pd drop-off function for a particular LIDAR beam may be defined by the following equation:

$$P_d = \frac{1}{2}\mathrm{erfc}\left[\mathrm{erfc}^{-1}(2P_{fa}) - \sqrt{\beta\frac{r^2}{2R^4}}\right]$$

where $P_{fa}$ and $\beta$ are intrinsic parameters of the particular LIDAR beam, or channel, and erfc is the Gauss error function. As previously noted, R is the range to the target object and r is the reflectivity of the target object. It will be recognized that if the Pd function is too time- and/or resource-intensive to generate on the fly for every single ray trace, lookup tables or interpolation may be used to implement the function. It will be further recognized that the drop-off value for a particular beam increases with increasing reflectivity of the target object and decreases with increasing range to the target object.

In step 630, for each ray of the LIDAR beam that hits the target object, a Pd value may be generated using the corresponding Pd function defined for the LIDAR beam, or channel, in step 620. Each ray that hits the target object may be considered a corresponding data point.

In step 640, a random draw from a probability distribution may be performed to determine whether or not to discard the corresponding data point. In some embodiments, the probability distribution may be a discrete distribution. In particular, in some embodiments, the probability distribution may be a Bernoulli random distribution. In step 640, a draw from a Bernoulli random distribution with parameter Pd may be performed as follows. With likelihood Pd, a range return is generated, meaning that the corresponding data point is collected, or accumulated. With likelihood 1-Pd, a "no return" is generated, meaning that the corresponding data point is discarded. It will be recognized that step 640 may be performed by (1) drawing x from a uniform probability distribution with domain [0,1]; (2) if x meets a first condition, generate a range return; and (3) if x fails to meet the first condition, generate no return. In certain embodiments, the first condition may be x≤Pd.

In step 650, the collected data points may be used to identify and/or classify the target object. Additionally and/or alternatively, the collected data points may be used by the training module to train the classification model.

Select Examples

Example 1 provides a method for simulating LIDAR data, the method including retrieving a simulated scene that simulates a real-world scene, the simulated scene including at least one target object having a reflectivity r and located at a range R from a LIDAR sensor, the LIDAR sensor having at least one intrinsic parameter; generating a probability of detection (Pd) drop-off function for the LIDAR sensor, where the Pd drop-off function is related to r, R, and the at least one intrinsic parameter; and, for each data point including a ray emitted by the LIDAR sensor that hits the target object, generating a Pd value using the Pd drop-off function; and determining based on the Pd value whether to discard the data point or to add the data point to a collection of data points.

Example 2 provides the method of example 1, further including classifying the target object using the collection of data points.

Example 3 provides the method of any of examples 1-2, where the at least one intrinsic parameter of the LIDAR sensor may optionally include a probability of false alarm (Pfa).

Example 4 provides the method of any of examples 1-3, where the at least one intrinsic parameter of the LIDAR sensor may optionally include a proportionality constant ($\beta$).

Example 5 provides the method of any of examples 1-4, where the Pd drop-off function is related to a Gauss error function (erfc).

Example 6 provides the method of any of examples 1-5, where the Pd drop-off function is defined by:

$$P_d = \frac{1}{2}\text{erfc}\left[\text{erfc}^{-1}(2P_{fa}) - \sqrt{\beta\frac{r^2}{2R^4}}\right]$$

Example 7 provides the method of any of examples 1-6, where the determining based on the Pd value whether to discard the data point or to add the data point to the collection of data points may optionally include drawing x from a uniform distribution with domain [0, 1]; if x is less than or equal to the Pd value, refraining from dropping the data point; and if x is greater than the Pd value, dropping the data point.

Example 8 provides the method of any of examples 1-7, where the LIDAR sensor may optionally include multiple channels, the generating further including generating a probability of detection (Pd) drop-off function for each of the multiple channels of the LIDAR sensor, where the Pd drop-off function is related to r, R, and at least one intrinsic parameter of the channel.

Example 9 provides the method of any of examples 1-8, where the simulated scene is generated using data collected from the real-world scene.

Example 10 provides the method of any of examples 1-9, where the LIDAR sensor is a spinning LIDAR.

Example 11 provides the method of example 10, where each channel of the LIDAR sensor operates at a different transmit power.

Example 12 provides the method of example 10, where each channel of the LIDAR sensor may optionally include a transceiver pair.

Example 13 provides one or more non-transitory computer-readable media storing instructions executable to perform operations for simulating LIDAR data, the operations including retrieving a simulated scene that simulates a real-world scene, the simulated scene including at least one target object having a reflectivity r and located at a range R from a LIDAR sensor, the LIDAR sensor having at least one intrinsic parameter; generating a probability of detection (Pd) drop-off function for the LIDAR sensor, where the Pd drop-off function is related to r, R, and the at least one intrinsic parameter; for each data point including a ray emitted by the LIDAR sensor that hits the target object, generating a Pd value using the Pd drop-off function; and determining based on the Pd value whether to drop the data point from a collection of data points; and classifying the target object based on the collection of data points.

Example 14 provides the one or more non-transitory computer-readable media of example 13, where the at least one intrinsic parameter of the LIDAR sensor may optionally include at least one of a probability of false alarm (Pfa) and a proportionality constant (β).

Example 15 provides the one or more non-transitory computer-readable media of any of examples 13-14, where the Pd drop-off function is related to a Gauss error function (erfc).

Example 16 provides the one or more non-transitory computer-readable media of any of examples 13-15, where the determining based on the Pd value whether to drop the data point from the collection of data points may optionally include drawing a Bernoulli random distribution with a parameter including the Pd value; with a likelihood of the Pd value, refraining from dropping the data point; and, with a likelihood of 1 minus the Pd value, dropping the data point.

Example 17 provides the one or more non-transitory computer-readable media of any of examples 13-16, where the LIDAR sensor may optionally include multiple channels, the generating further including generating a probability of detection (Pd) drop-off function for each of the multiple channels of the LIDAR sensor, where the Pd drop-off function is related to r, R, and at least one intrinsic parameter of the channel.

Example 18 provides a computer-implemented system for simulating LIDAR data, the computer-implemented system including a processor; and one or more non-transitory computer-readable media storing instructions that when executed by the processor cause the processor to perform operations including retrieving a simulated scene that simulates a real-world scene, the simulated scene including at least one target object having a reflectivity r and located at a range R from a LIDAR sensor, the LIDAR sensor having at least one intrinsic parameter; generating a probability of detection (Pd) drop-off function for the LIDAR sensor, where the Pd drop-off function is related to r, R, and the at least one intrinsic parameter; for each data point including a ray emitted by the LIDAR sensor that hits the target object, generating a Pd value using the Pd drop-off function; and determining based on the Pd value whether to include the data point in a collection of data points; and classifying the target object based on the collection of data points.

Example 19 provides the computer-implemented system of example 18, where the Pd drop-off function is defined by:

$$P_d = \frac{1}{2}\text{erfc}\left[\text{erfc}^{-1}(2P_{fa}) - \sqrt{\beta\frac{r^2}{2R^4}}\right]$$

Example 20 provides the computer-implemented system of any of examples 18-19, where the determining based on the Pd value whether to include the data point in the collection of data points may optionally include drawing x from a uniform distribution with domain [0, 1]; if x is less than or equal to the Pd value, refraining from dropping the data point; and, if x is greater than the Pd value, dropping the data point.

Example 21 provides the computer-implemented system of any of examples 18-20, where the LIDAR sensor is a spinning LIDAR and where each channel of the LIDAR sensor operates at a different transmit power and may optionally include an individual transceiver pair.

Other Implementation Notes, Variations, and Applications

It may be to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It may be also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended claims. The specifications apply only to one non-limiting example and, accordingly, they should be construed as such. In the foregoing description, example embodiments have been described with reference to particular arrangements of components. Various modifications and changes may be made to such embodiments without departing from the scope of the appended claims. The description and drawings are, accordingly, to be regarded in an illustrative rather than in a restrictive sense.

Note that with the numerous examples provided herein, interaction may be described in terms of two, three, four, or more components. However, this has been done for purposes of clarity and example only. It should be appreciated that the system can be consolidated in any suitable manner. Along similar design alternatives, any of the illustrated components, modules, and elements of the figures may be combined in various possible configurations, all of which are clearly within the broad scope of this Specification.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it may be intended that the present disclosure encompass all such changes, substitutions, variations, alterations, and modifications as falling within the scope of the appended claims. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph (f) of 35 U.S.C. Section 112 as it exists on the date of the filing hereof unless the words "means for" or "step for" are specifically used in the particular claims; and (b) does not intend, by any statement in the Specification, to limit this disclosure in any way that may be not otherwise reflected in the appended claims.

What is claimed is:

1. One or more non-transitory computer-readable media storing instructions executable to perform operations for simulating Light Detection and Ranging (LIDAR) data, the operations comprising:
   retrieving, at an online system, a simulated scene that simulates a real-world scene, the simulated scene including at least one target object having a reflectivity r and located at a range R from a LIDAR sensor, the LIDAR sensor having at least one intrinsic parameter;
   for each data point comprising a ray emitted by the LIDAR sensor that hits the target object:
   generating a probability of detection (Pd) value using a Pd drop-off function defined for the LIDAR sensor, wherein the Pd drop-off function is related to r, R, and the at least one intrinsic parameter of the LIDAR sensor;
   wherein the Pd drop-off function is defined by:

$$P_d = \frac{1}{2}\mathrm{erfc}\left[\mathrm{erfc}^{-1}(2P_{fa}) - \sqrt{\beta\frac{r^2}{2R^4}}\right],$$

wherein Pfa comprises a probability of false alarm for the LIDAR sensor, β comprises a proportionality constant for the LIDAR sensor, and erfc comprises a Gauss error function;
   determining based on the Pd value whether to drop the data point from a collection of data points;
   classifying the target object based on the collection of data points, using the online system;
   communicating the classification of the target object to a navigation module of an autonomous vehicle (AV) using an interface module of the online system; and
   modifying a navigation route for the AV based on the classification and operating the AV along the modified navigation route using the navigation module.

2. The one or more non-transitory computer-readable media of claim 1, wherein the at least one intrinsic parameter of the LIDAR sensor comprises at least one of a probability of false alarm (Pfa) and a proportionality constant (B).

3. The one or more non-transitory computer-readable media of claim 1, wherein the determining based on the Pd value whether to drop the data point from the collection of data points comprises:
   drawing a Bernoulli random distribution with a parameter comprising the Pd value;
   with a likelihood of the Pd value, adding the data point to the collection of data points; and
   with a likelihood of 1 minus the Pd value, dropping the data point from the collection of data points.

4. The one or more non-transitory computer-readable media of claim 1, wherein the LIDAR sensor comprises multiple channels, the operations further comprising, for each data point comprising a ray emitted by one of the channels of the LIDAR sensor that hits the target object, generating a Pd value using a Pd drop-off function defined for the one of the channels of the LIDAR sensor.

5. The non-transitory computer-readable media of claim 1, wherein the online system is in communication with the AV using one of a wireless local area network (WLAN) and a cellular system.

6. A computer-implemented system for simulating Light Detection and Ranging (LIDAR) data, the computer-implemented system comprising:
an online system including a processor; and
one or more non-transitory computer-readable media storing instructions that when executed by the processor cause the processor to perform operations comprising:
retrieving a simulated scene that simulates a real-world scene, the simulated scene including at least one target object having a reflectivity r and located at a range R from a LIDAR sensor, the LIDAR sensor having at least one intrinsic parameter;
for each data point comprising a ray emitted by the LIDAR sensor that hits the target object:
generating a probability of detection (Pd) value using a Pd drop-off function defined for the LIDAR sensor, wherein the Pd drop-off function is related to r, R, the at least one intrinsic parameter;
wherein the Pd drop-off function is defined by:

$$P_d = \frac{1}{2} \text{erfc}\left[\text{erfc}^{-1}(2P_{fa}) - \sqrt{\beta \frac{r^2}{2R^4}}\right],$$

wherein Pfa comprises a probability of false alarm for the LIDAR sensor, β comprises a proportionality constant for the LIDAR sensor, and erfc comprises a Gauss error function;
determining based on the Pd value whether to include the data point in a collection of data points; and
classifying the target object based on the collection of data points;
communicating the classification of the target object to a navigation module of an autonomous vehicle (AV) using an interface module of the online system; and
modifying a navigation route for the AV based on the classification and operating the AV along the modified navigation route using the navigation module.

7. The computer-implemented system of claim 6, wherein the determining based on the Pd value whether to include the data point in the collection of data points comprises:
drawing x from a uniform distribution with domain [0, 1];
if x is less than or equal to the Pd value, including the data point in the collection of data points; and
if x is greater than the Pd value, excluding the data point from the collection of data points.

8. The computer-implemented system of claim 6, wherein the online system is in communication with the AV using one of a wireless local area network (WLAN) and a cellular system.

9. A method for simulating Light Detection and Ranging (LIDAR) data, the method comprising:
retrieving, at an online system, a simulated scene that simulates a real-world scene, the simulated scene including at least one target object having a reflectivity r and located at a range R from a LIDAR sensor, the LIDAR sensor having at least one intrinsic parameter;
for each of a plurality of data points comprising rays emitted by the LIDAR sensor that hit the target object, determining based on a drop-off function defined for the LIDAR sensor whether to discard the data point or to add the data point to a collection of data points;
wherein the drop-off function is defined by:

$$P_d = \frac{1}{2} \text{erfc}\left[\text{erfc}^{-1}(2P_{fa}) - \sqrt{\beta \frac{r^2}{2R^4}}\right],$$

wherein Pfa comprises a probability of false alarm for the LIDAR sensor, β comprises a proportionality constant for the LIDAR sensor, and erfc comprises a Gauss error function;
classifying the target object based on the collection of data points;
communicating the classification of the target object to a navigation module of an autonomous vehicle (AV) using an interface module of the online system; and
modifying a navigation route for the AV based on the classification and operating the AV along the modified navigation route using the navigation module.

10. The method of claim 9, wherein the drop-off function is related to r, R, and the at least one intrinsic parameter.

11. The method of claim 9, wherein the determining further comprises, for each of the data points:
generating a probability of detection (Pd) value using the drop-off function defined for the LIDAR sensor; and
determining based on the Pd value whether to discard the data point or to add the data point to the collection of data points.

12. The method of claim 11, wherein the determining based on the Pd value whether to discard the data point or to add the data point to the collection of data points comprises:
drawing x from a uniform distribution with domain [0, 1];
if x is less than or equal to the Pd value, adding the data point to the collection of data points; and
if x is greater than the Pd value, discarding the data point.

13. The method of claim 9, further comprising classifying the target object using the collection of data points.

14. The method of claim 9, wherein the LIDAR sensor comprises multiple channels, the determining further comprising:
for each of the plurality of data points comprising rays emitted by one of the channels of the LIDAR sensor that hit the target object, determining based on a drop-off function defined for the one of the channels of the LIDAR sensor whether to discard the data point or to add the data point to the collection of data points.

15. The method of claim 14, wherein each of the channels of the LIDAR sensor operates at a different transmit power.

16. The method of claim 14, wherein each of the channels of the LIDAR sensor comprises a transceiver pair.

17. The method of claim 9, wherein the LIDAR sensor comprises a spinning LIDAR.

18. The method of claim 9, wherein the simulated scene is generated using data collected from the real-world scene.

19. The method of claim 9, wherein the online system is in communication with the AV using one of a wireless local area network (WLAN) and a cellular system.

* * * * *